(12) United States Patent
Chickering, III et al.

(10) Patent No.: US 6,308,434 B1
(45) Date of Patent: Oct. 30, 2001

(54) SPRAY DRYING METHOD

(75) Inventors: Donald E. Chickering, III, Framingham; Mark J. Keegan, Andover; Greg Randall, Stoneham; Howard Bernstein, Cambridge; Julie Straub, Winchester, all of MA (US)

(73) Assignee: Acusphere, Inc., Cambridge, MA (US)

( * ) Notice: Subject to any disclaimer, the term of this patent is extended or adjusted under 35 U.S.C. 154(b) by 0 days.

(21) Appl. No.: 09/756,950

(22) Filed: Jan. 9, 2001

Related U.S. Application Data

(63) Continuation-in-part of application No. 09/304,257, filed on May 3, 1999, now Pat. No. 6,223,455.

(51) Int. Cl.⁷ .................................................... F26B 3/08

(52) U.S. Cl. ................................ 34/373; 34/360; 34/372; 34/381; 34/330

(58) Field of Search .......................... 34/329, 330, 359, 34/360, 372, 373, 381; 159/4.01, 4.02, 48.1

(56) References Cited

U.S. PATENT DOCUMENTS

| | | | |
|---|---|---|---|
| 2,889,874 | | 6/1959 | Gauvin . |
| 2,912,768 | * | 11/1959 | Huston et al. ...................... 406/109 |
| 3,908,632 | * | 9/1975 | Poulsen ................................. 126/643 |
| 4,187,617 | * | 2/1980 | Becker, Jr. et al. .................... 34/576 |
| 4,441,822 | * | 4/1984 | Biswas et al. ........................ 366/101 |
| 4,521,378 | * | 6/1985 | Ichimura et al. ..................... 422/135 |
| 4,970,030 | | 11/1990 | Prudhorn et al. . |
| 5,096,537 | * | 3/1992 | Bergquist et al. .................. 159/4.01 |
| 5,111,596 | * | 5/1992 | Laurenty ................................ 34/578 |
| 5,581,903 | * | 12/1996 | Botich ..................................... 34/264 |
| 5,622,657 | | 4/1997 | Takada et al. . |
| 5,647,142 | * | 7/1997 | Anderson et al. ...................... 34/373 |
| 5,853,698 | | 12/1998 | Straub et al. . |
| 5,855,913 | | 1/1999 | Hanes et al. . |
| 5,924,216 | * | 7/1999 | Takahashi .............................. 34/374 |

FOREIGN PATENT DOCUMENTS

| | | |
|---|---|---|
| 634 467 | 3/1950 | (GB) . |
| 07 090 307 | 4/1995 | (JP) . |
| 280 499 | 12/1964 | (NL) . |

OTHER PUBLICATIONS

Masters, *Spray Drying Handbook*, Fifth edition, pp. 136–152, 303–308, 498–537, and 643–650, John Wiley & Sons, Inc.: New York, 1991.

* cited by examiner

*Primary Examiner*—Pamela Wilson
(74) *Attorney, Agent, or Firm*—Holland & Knight LLP

(57) ABSTRACT

Improved spray drying methods of have been developed. The spray drying method includes use of a primary drying chamber and a secondary drying apparatus which includes tubing having a length sufficient to increase the contact time between the drying gas and the droplets/particles to dry the particles to the extent desired, at a drying rate and temperature which would be too low to provide adequate drying without the secondary drying apparatus. The secondary drying apparatus increases the drying efficiency of the spray dryer system without increasing the drying rate, while minimizing loss in yield. The ratio of the length of tubing to the length of the primary drying chamber is at least 2:1. The tubing diameter is substantially smaller than the diameter of the primary drying chamber, such that the particles move at higher velocity through the tubing to minimize product losses. The ratio of the cross-sectional area of the primary drying chamber to the cross-sectional area of the tubing most preferably is about 16:1. The tubing preferably is in a compact coil design, which can more easily be transported and which has minimum space requirements, and may optionally include a jacket to control the temperature of the secondary drying process. A preferred application for the spray drying process and equipment is in the production of microparticles, between about 1 and 200 μm in diameter, which can be used to deliver therapeutic and diagnostic agents.

20 Claims, 1 Drawing Sheet

SPRAY DRYING METHOD

This application is a continuation-in-part under 35 U.S.C. § 120 of U.S. Ser. No. 09/304,257 filed May 3, 1999, now U.S. Pat. No. 6,223,455.

BACKGROUND OF THE INVENTION

This invention generally relates to spray dryers and more particularly to methods and equipment for drying particles produced by spray drying.

Spray drying is commonly used in the production of particles for many applications, including food, cosmetics, fertilizers, dyes, and abrasives. Spray drying can be tailored to create a wide spectrum of particle sizes, including microparticles. Spray dried particles are useful in a variety of biomedical and pharmaceutical applications, such as the delivery of therapeutic and diagnostic agents, as described for example in U.S. Pat. No. 5,853,698 to Straub et al., U.S. Pat. No. 5,855,913 to Hanes et al., and U.S. Pat. No. 5,622,657 to Takada et al.

In a typical process for making particles using a spray drying process, a solid forming material, such as a polymer, which is intended to form the bulk of the particle, is dissolved in an appropriate solvent to form a solution. Alternatively, the material can be suspended or emulsified in a non-solvent to form a suspension or emulsion. Other components, such as drugs, diagnostic agents, or pore forming agents, optionally are added at this stage. The solution then is atomized to form a fine mist of droplets. The droplets immediately enter a drying chamber where they contact a drying gas. The solvent is evaporated from the droplets into the drying gas to solidify the droplets, thereby forming particles. The particles then are separated from the drying gas and collected.

In scaling up such a spray drying process, for example from the laboratory or pilot plant scale to the commercial plant scale, certain disadvantages may be encountered. For example, if the drying efficiency is not adequately scaled, the solvent content of the product particles may increase undesirably. While increasing the drying capacity or drying rate should compensate for this insufficient drying, the increased drying rate may induce other problems. For example, it has been observed that increasing the drying rate results in unsuitable particle morphology and/or size distribution for some product particles, such as those having critically defined performance specifications. The change in drying rate may, for instance, alter the way in which the solid-forming material precipitates as the solvent is evaporated, thereby changing the structure (e.g., porosity) of the particle to be out of specification, rendering the particle unable to properly contain and deliver a diagnostic or therapeutic agent. Furthermore, changing the drying rate by reducing the flowrate (and consequently the velocity) of the drying gas may substantially reduce the product yield.

Even in cases where particle morphology and size distribution are less critical, scaling up the drying efficiency may require undesirably large increases in the size of process equipment, such as the drying chamber, drying gas source, and drying gas heater. The drying capacity generally is a function of the drying gas temperature, flowrate, pressure, and solvent composition. Moreover, larger capacity equipment generally requires more plant space. It is desirable to minimize the capital investment and space required to scale up a production process.

Inadequate product drying can also be a problem with known spray drying processes, particularly for some pharmaceutical products which must be dried at low temperatures in order to maintain the stability and/or activity of these materials. Further drying of these materials sensitive to high temperatures can be done using a fluidized bed; however, this process often results in undesirably variable process yields.

Known spray dryers typically are unsuitable for aseptic processing, as they may operate at negative pressure, for example, and may not be designed or constructed to comply with regulatory requirements. In particular, they do not provide a way to completely dry the material aseptically in a sanitizable, closed, and positive-pressure system.

It is therefore an object of the present invention to provide a method and apparatus for effectively drying particles made by spray drying.

It is another object of the present invention to provide a method and apparatus for spray drying that incorporates a drying process providing improved drying of the particles without detrimentally affecting product yield.

It is a further object of the present invention to provide an apparatus for drying spray dried particles that is relatively compact and inexpensive.

It is still another object of the present invention to provide a method and apparatus for spray-drying particles at low temperatures so as to preserve the stability or activity of labile materials.

SUMMARY OF THE INVENTION

Improved spray drying methods and equipment are provided. In a preferred embodiment of the method, particles are formed by spraying a solution (or emulsion or solid-in-liquid suspension) of a material into a primary drying chamber and evaporating at least a portion of the solvent (or nonsolvent liquid) sufficient to solidify the particles. The solvent (or nonsolvent) is evaporated into the drying gas in which the particles are entrained. Then, the partially dried particles flow from the primary chamber into a secondary drying apparatus for additional drying. The secondary drying apparatus increases the drying efficiency of the spray dryer system without increasing the drying rate, while minimizing loss in yield.

The secondary drying apparatus includes tubing having a length sufficient to increase the contact time between the drying gas and the particles (i.e. increase the residence time) to dry the particles to the extent desired, at a drying capacity or drying rate and temperature which would be too low to provide adequate drying using only the primary drying chamber. The ratio of the length of tubing to the length of the primary drying chamber is at least 2:1, and more preferably at least 3:1. The tubing cross-sectional area is substantially smaller than the cross-sectional area of the primary drying chamber, such that the particles move at higher velocity through the tubing to minimize product losses. The ratio of the cross-sectional area of the primary drying chamber to the cross-sectional area of the tubing preferably is between about 2:1 and 500:1, more preferably is between about 4:1 and 100:1, and most preferably is about 16:1.

In a preferred embodiment, the tubing is stainless steel, and electropolished to 20 RA or smoother, to provide a smooth surface for enhanced particle yield. The tubing preferably is in a compact coil design, for easier transporting and which has minimum space requirements. In another preferred embodiment, the tubing has a jacket to control the temperature of the secondary drying process. The primary drying chamber and secondary apparatus can be integrated into a single unit.

A preferred application for the spray drying process and equipment is in the production of particles between about 1 and 200 µm in diameter, which can be used in the delivery of a diagnostic or therapeutic agent.

DETAILED DESCRIPTION OF THE INVENTION

Figure 1:
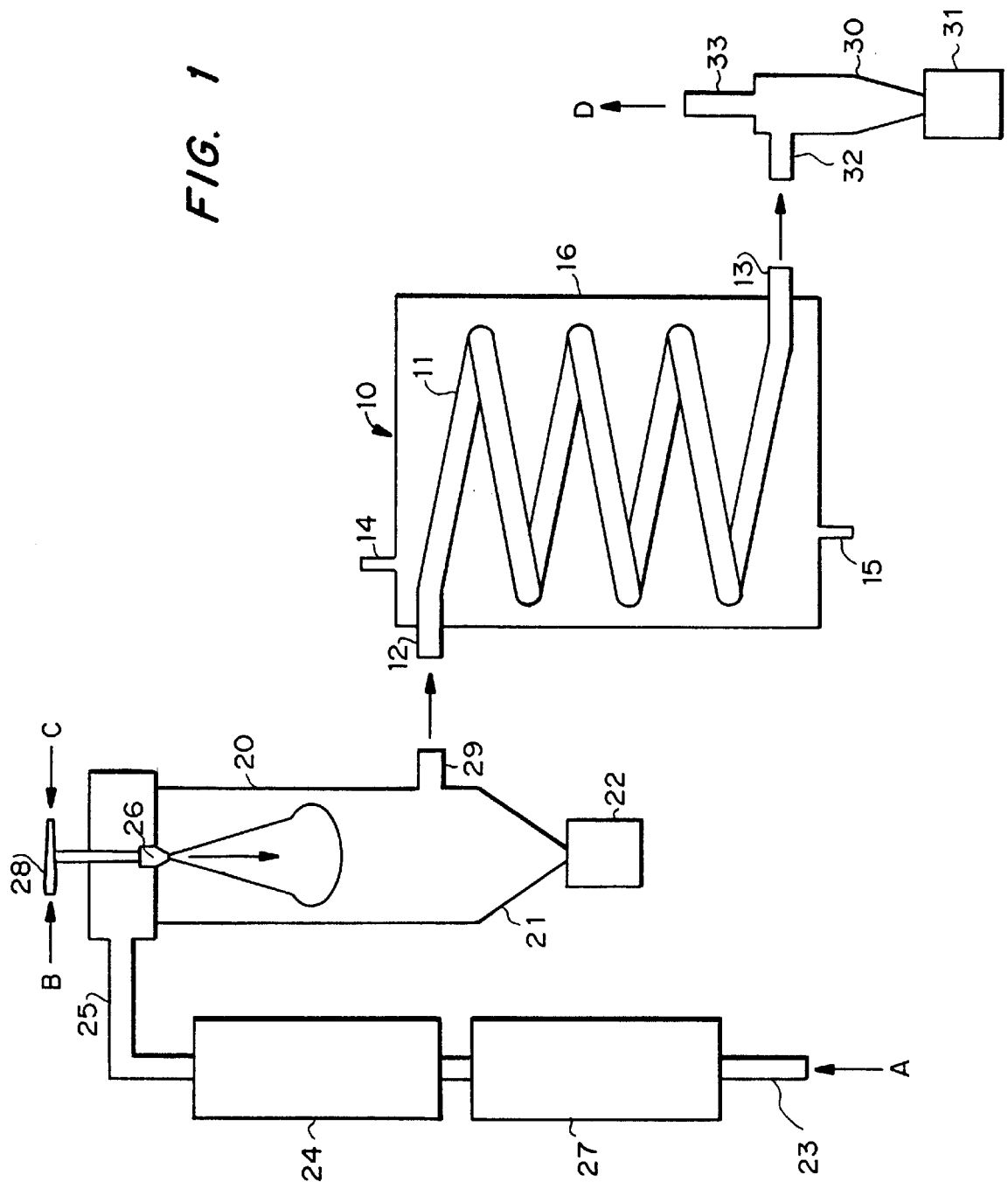
FIG. 1 is a process equipment diagram of a preferred embodiment of the secondary drying apparatus integrated into a process for making and collecting spray dried particles.

Improved spray drying methods and equipment have been developed. The improved process design enhances drying of spray dried particles prior to collection by increasing the time the particles contact the drying gas, preferably without increasing the drying rate or reducing the product yield. The increased residence time is accomplished by use of a secondary drying apparatus.

As used herein, the term "drying" in reference to droplets or particles means the removal of the solvent from the droplet or particle.

"Drying capacity" refers to the theoretical maximum quantity of liquid volatiles that can be evaporated into the drying gas. For example, if the drying capacity is met, the drying gas stream will be fully saturated with the volatiles. The drying capacity parameter is dependent on the drying gas flowrate, temperature, pressure, and volatile composition.

"Drying efficiency" refers to the quantity of evaporated liquid volatiles divided by the drying capacity for a given set of process parameters. The drying efficiency parameter depends on the solution flowrate, drying gas flowrate, temperature, pressure, and volatile composition, as well as the geometry of the drying chamber and the residence time of the material being dried.

"Drying rate" refers to the quantity of liquid volatiles evaporating from the surface of atomized droplets as a function of time. The drying rate is a function of particle size, composition, and morphology; drying gas temperature, pressure, and flowrate; solution flowrate; drying gas humidity; and particle position along the drying path length.

As used herein, the term "solvent" refers to the liquid in which the material forming the bulk of the spray dried particle is dissolved, suspended, or emulsified for delivery to the atomizer of a spray dryer and which is evaporated into the drying gas, whether or not the liquid is a solvent or nonsolvent for the material. Other volatilizable components, such as a volatile salt, may be included in the bulk material/liquid, and also volatilized into the drying gas. Examples of volatile salts, which are useful pore-forming agents, include ammonium bicarbonate, ammonium acetate, ammonium chloride, and ammonium benzoate.

The particles made by spray drying processes can be of any size. As used herein, the term "particle" includes micro-, submicro-, and macro-particles. Generally, the particles are between about 100 nm and 5 mm in diameter or longest dimension. The particles can be spheres, capsules, irregular shapes, crystals, powders, agglomerates, or aggregates. The particles can be hollow, that is they can have an outer shell surrounding a core of gas, such as a diagnostic agent, or they can be formed having pores through the solid material, yielding a honeycombed or sponged structure. The particles can be generally solid, that is they can be homogeneous throughout or they can include smaller solid particulates of diagnostic or therapeutic agent dispersed throughout the solid material of each particle.

Apparatus

A preferred embodiment of the secondary drying apparatus 10 is shown in FIG. 1, as part of a spray dryer system. The secondary drying apparatus 10 includes a coil of tubing which forms the drying coil 11, having drying coil inlet 12 and drying coil outlet 13. The drying coil 11 is surrounded by a drying coil jacket 16. The jacket 16 includes a jacket inlet 14 and a jacket drain 15. The jacket inlet 14 and jacket drain 15 provide a means for a heat exchange medium, such as cooling water, to flow respectively into and out of the drying coil jacket 16. The drying coil jacket 16 is based on standard designs known in the heat exchanger art.

As used herein, the "primary drying chamber" is defined to be the vessel into which the atomized material and solvent is sprayed from the atomizer. The primary drying chamber has an internal flow space terminating in a discharge outlet. As used herein, the "discharge outlet" of the primary drying chamber is defined to be the area in which flowing drying gas/particles initially encounter a reduction in the flow cross-sectional area of at least 25% (i.e. the point at which the ratio of the cross-sectional area of the primary drying chamber to the cross-sectional area of the tubing is at least 4:3).

As used herein, the "length of the primary drying chamber" is defined to be the approximate minimum distance a droplet/particle must travel from the atomizer to reach the discharge outlet.

As used herein, the term "atomizer" refers to any atomization device. Representative atomizers include pressure nozzles, pneumatic nozzles, sonic nozzles, and rotary atomizers. Examples of suitable rotary atomizers include bushing wheels, vaned wheels, and vaneless discs. Pressure nozzles include swirled chamber and grooved core types. Pneumatic nozzles include two fluid (internal and external mixing) and three fluid types. Sonic nozzles include siren and whistle types.

As used herein, the terms "tubing" or "tube" refer to a pipe or other conduit having at least one inlet and at least one outlet. The cross-section of the tubing can be of any shape; circular is preferred. The tubing can be formed into any configuration. For example, it can be straight, serpentine, or coiled. Portions of the tubing can be stacked in connected layers, as commonly found in heat exchanger applications. The coil can be polygonal, circular, or a combination thereof. In a preferred embodiment, a circular coiled design is used, since it provides a compact design and is generally free of sharp bends in the flow path, which can provide unwanted points of particle impact and accumulation.

Tubing Dimensions

The tubing must have a pathway length long enough to provide sufficient contact time (i.e. residence time) between the drying gas and the particles as the particles travel from the discharge of the primary drying chamber to the product collection point, to dry the particles to the desired level using the specified drying rates, drying gas velocity, and temperatures. As used herein, the term "length" used in reference to the tubing refers to the approximate minimum distance a droplet/particle must travel from the inlet to reach the outlet. At a given velocity, the minimum length required to provide the necessary residence time for a given set of process conditions and materials may have to be obtained empirically. In a preferred method for empirically determining the minimum required length, a series of tubes of increasing length can be used in a series of spray drying tests run at constant flow rate and temperature, followed by measuring the moisture (i.e. the solvent residue) remaining in the product particles. One can then plot the moisture versus tube length to obtain a length-moisture curve. From this curve, one can extrapolate to obtain the minimum length required to obtain a particular moisture level for the set drying rate and drying gas velocity.

While the methods described above for selecting a residence time and tubing length can be adapted for use with a wide range of drying gas velocities, the velocity of the drying gas has been found to be critical to the production yield of the particles. For example, too low a velocity can cause particles to settle out of the gas stream. Too low of a velocity also can increase aggregation of material along the vessel wall due to (1) cohesion if particles are inadequately dry and have a tacky surface, (2) electrostatic forces due to static build up on well-dried particles, and/or (3) mechanical entrapment, for example, in cracks at piping joints or in microcracks in inadequately polished piping surfaces. The effect of a change in drying gas velocity depends on several factors, such as the particle's size, density, and aerodynamic properties. Typically, the drying gas velocity in the primary drying chamber is between about 0.1 and 100 m/s. In a preferred embodiment, the drying gas velocity in the primary drying chamber is between about 0.5 and 5 m/s.

In a preferred embodiment, the length of the tubing is at least twice the length of the primary drying chamber. More preferably, this tubing length to primary drying chamber ratio is greater than 3:1.

For some spray drying applications, the diameter of the tubing of the second drying apparatus is only slightly less than the diameter of the primary drying chamber, for example, having a reduction ratio (primary drying chamber cross-sectional area:tubing cross-sectional area) between 4:3 and 2:1. In a preferred embodiment, however, the diameter of the tubing is significantly smaller than the diameter of the primary drying chamber, thereby increasing the particle and gas velocity in the tubing compared to their velocity in the primary drying chamber in order to maximize product yield. The reduction ratio is preferably between 2:1 and 500:1, more preferably between about 4:1 and 100:1, and most preferably about 16:1. One of skill in the art can readily optimize this ratio for a given product, based on various process parameters, including the mass flow rates of drying gas and particle material and gas transfer equipment specifications.

The cross-sectional area of the tubing can be constant over, or can vary along, the length of the tubing. For example, one or more reducers (or expanders) can be used to connect sections of tubing to one another or to the primary drying chamber. In a preferred embodiment, the cross-sectional area is substantially uniform along the length of the tubing.

Other Tubing Specifications

The tubing can be formed of, or lined with, any material of sufficient structural integrity that is compatible with the spray dried particles. The tubing should be resistant to corrosion and crack damage. If jacketed, the tubing material should be compatible with the heat exchange medium selected. Representative materials include glasses, polymers, metals, and composites thereof. Examples of suitable metals include copper, aluminum, iron, brass, nickel, and steel. Polymeric materials generally should be properly grounded to prevent static charge build-up, which can cause particle accumulation and can otherwise be hazardous. Examples of suitable polymeric materials include polyvinylchloride and polytetrafluoroethylene (TEFLON™). The materials of construction are particularly important for particles intended for use in biomedical applications, where purity is essential. In a preferred embodiment, the tubing is medical grade stainless steel.

The surface roughness of the inside of the tubing generally is a design consideration. A rough surface may reduce the yield and create problems with product purity in some applications, especially pharmaceutical grade products. The tubing preferably has a Roughness Average (RA) of 50 or smoother, and more preferably 20 or smoother. Standard electropolishing techniques can be used, for example, on stainless steel tubing to achieve these roughness levels.

In a preferred embodiment, the spray drying apparatus and system is designed and constructed to operate in a sterile or aseptic manner in order to produce sterile particles, particularly particles for medical or pharmaceutical products. It is preferred that the sterility can be certified or validated using known techniques. The apparatus can be made using techniques, equipment, and materials known in the art, and should be, for example, resistant to steam, heat, ionizing radiation, and/or sterilizing chemical vapors such as ethylene oxide, volatile peroxides and ozone. Couplings between sections of the apparatus should be selected to maintain the sterile conditions. Examples include TRICLO-VER™ or equivalent flanges and gaskets.

The design and arrangement of the spray drying apparatus also should prevent, or at least minimize, powder accumulating within the apparatus or system except where intended (e.g., in a collector such as a cyclone). For example, the secondary dryer preferably is positioned to provide a constant downward slope from the primary chamber to the collection device. Additional gas feeds, preferably at a controlled temperature and sterile, can be provided at any point in the spray drying apparatus or system to facilitate particle transport and prevent unwanted accumulation throughout the entire apparatus to the collection point.

Method of Use

A preferred method of using the secondary drying apparatus is described with reference to FIG. 1, wherein the secondary drying apparatus 10 is part of a spray drying process that includes a primary drying chamber 20, a product cyclone 30, and a product collection container 31. While FIG. 1 shows a co-current vertical downward flow spray dryer having a conical bottom, the methods and apparatus described herein are adaptable to essentially any type of spray dryer, including cross-current, mixed, or spiral flow dryers, having horizontal, vertical-up, or vertical-down flows. The primary drying chamber generally can be of any shape, including cylindrical, conical, or parallelepiped.

A product solution (C) is sprayed or atomized into primary drying chamber 20 through a nozzle 26. The drying gas (A) enters through the drying gas feed inlet 23, passes through drying gas heater 27, and then flows through drying gas filter 24 to remove dust and other fine particulate matter. The drying gas then enters the primary drying chamber 20 through drying gas inlet 25. Atomization gas (B) is supplied to nozzle 26 through atomization gas line 28 and fed through atomizer 26 into the primary drying chamber 20.

The drying gas flow to drying gas feed inlet 23 can be induced by a variety of gas generating and/or transfer devices, such as a fan, blower, compressor, or liquefied gas evaporator. The gas source can be atmospheric air or a dedicated source of compressed gas or liquefied gas, stored for example in pressurized tanks. In a preferred embodiment, the drying gas is nitrogen, which is generated from a liquid nitrogen vaporizer, wherein the tank or vaporizer pressure provides the driving force.

The atomized droplets solidify into particles as they contact and are entrained in the cocurrent drying gas flow. Oversized particles are collected in collection jar 22. The remaining particles exit through primary drying chamber discharge outlet 29 and flow to secondary drying apparatus 10, where the particles pass through drying coil 11 via inlet 12 and outlet 13. The sufficiently dried particles then enter product cyclone 30 through product cyclone inlet 32. In product cyclone 30, the particles are separated from the drying gas (D), which is exhausted through product cyclone outlet 33. The dried particles are collected in product collection container 31.

One can finely control the drying process by controlling the circulation of a heat exchange medium through the drying coil jacket 16 during the spray drying process. Representative heat exchange media include water (liquid and steam), acetone, air, brine, d'limonene, ethanol, ethylene glycol, freons, isopropanol, nitrogen (gaseous and liquid), methanol, propylene glycol, silicon oil, and sulfur hexafluoride. Temperature control may be particularly important for maintaining the stability of product particles which are formed or contain highly temperature sensitive substances, such as thermally labile drugs (including but not limited to proteins, peptides, vaccines, and nucleic acids) while simultaneously maximizing the drying efficiency.

The spray drying methods and equipment can be adapted for use in either a continuous or batch process.

In a preferred embodiment, the temperature of the inlet and outlet ports can be controlled to produce the desired products, and may be varied depending on the gas, solvent, and solid material used. For polymeric particles, the size of the particles of polymer solution is a function of the atomizer used to spray the polymer solution, the atomizer pressure, the flow rate, the polymer used, the polymer concentration, the type of solvent, the viscosity, the temperature of spraying (both inlet and outlet temperature), and the molecular weight of the polymer. Generally, the higher the molecular weight, the larger the particle size, assuming the concentration is the same.

In a typical spray drying process for making particles formed of polymeric materials, therapeutic agents such as drugs, or combinations thereof using the apparatus and methods described herein, the following process parameters are used: inlet temperature=30 to 400° C.; outlet temperature=6 to 100° C.; emulsion/solution/suspension flow rate=5 to 5000 ml/min; and nozzle diameter=0.2 to 4 mm ID. For polymeric particles, the polymer concentration in the emulsion/solution/suspension typically is 0.001 to 0.75 g/ml, and for drug particles, the drug concentration in the emulsion/solution/suspension also typically is 0.001 to 0.75 g/ml. The particle morphology depends on the several factors, including the selection of polymer and/or therapeutic agent, as well as the concentration, molecular weight, and flow rates of materials. In typical industrial spray drying processes for products that are less temperature sensitive, typical outlet temperatures are between about 70 and 400° C. Masters, "Spray Drying Handbook" pp. 498–511 ($5^{th}$ ed., John Wiley & Sons 1991) describes typical plant design and spray drying conditions for a variety of materials. These designs and conditions can be adapted for use with the methods described herein.

Low inlet and outlet temperatures can be important for preserving the stability and activity of many pharmaceutical materials, particularly proteins, vaccines, peptides, nucleic acids, and chemically unstable drugs. Using the spray drying apparatus described herein to dry these materials, the inlet temperature can be less than 100° C., preferably less than 60° C., and more preferably less than 40° C. The outlet temperature typically is equal to or less than the inlet temperature and thus can be less than 100° C., preferably less than 60° C., and more preferably less than 40° C. In many embodiments, temperatures cooler than 40° C. are possible and preferable. For example, outlet temperatures of 25° C. or less, preferably 12° C. or less (See Example 3 below), are desirable, for example, for materials with low melting or degradation points.

Applications

The secondary drying apparatus and methods described herein can be used in, or adapted to, a variety of spray drying processes to make particles in various industries, including abrasives, agricultural products, biochemical products, chemicals, cosmetics, dyes, foods, metals (e.g. abrasives), pigments, and pharmaceuticals. Representative pharmaceutical and biochemical products and product classes include proteins, peptides, and nucleic acids, as well as antibiotics, enzymes, vitamins, yeasts, sera, vaccines, plasma-derived products, hormones, mycelia, and amino acids. Representative chemicals and metals include acyrlonitrile butadiene styrene (ABS), acrylic resin, alumina, aluminum sulfate, zinc and nickel catalysts, graphite, iron oxide, polyvinyl acetate, polyvinyl chloride, silica gel, sodium aluminate, titanium dioxide, and zinc phosphate. See Masters, "Spray Drying Handbook" pp. 499–511 ($5^{th}$ ed., John Wiley & Sons 1991), which describes these and other applications. The selection of the bulk material of the spray dried particle depends on the intended end use of the particle.

In one preferred embodiment, the spray drying apparatus is used to form particles of a therapeutic agent, which optionally can include one or more excipients. The therapeutic agent can be a small molecule drug or a larger molecule drug (e.g., peptide or protein), such as insulin, growth hormones, erythropoietin, or interferon. In an alternative preferred embodiment, the particles are formed of a bulk or matrix material having the therapeutic agent dispersed throughout the material, for use in controlled drug delivery.

The secondary drying apparatus preferably is used in a process to make particles having a diameter between about 100 nm and 5 mm, more preferably between about 1 and 200 μm. In a particularly preferred embodiment, the spray drying methods and equipment are adapted to make the microparticles as described in U.S. Pat. No. 5,853,698 to Straub et al.

The polymers that can be used in the methods and equipment described herein include synthetic and natural polymers, non-biodegradable and biodegradable polymers, and water-soluble and water-insoluble polymers. Representative synthetic polymers include poly(hydroxy acids) such as poly(lactic acid), poly(glycolic acid), and poly(lactic acid-co-glycolic acid), polyglycolides, polylactides, polylactide co-glycolide copolymers and blends, polyanhydrides, polyorthoesters, polyamides, polycarbonates, polyalkylenes such as polyethylene and polypropylene, polyalkylene glycols such as poly(ethylene glycol), polyalkylene oxides such as poly(ethylene oxide), polyalkylene terepthalates such as poly(ethylene terephthalate), polyvinyl alcohols, polyvinyl ethers, polyvinyl esters, polyvinyl halides such as poly(vinyl chloride), polyvinylpyrrolidone, polysiloxanes, poly(vinyl alcohols), poly(vinyl acetate), polystyrene, polyurethanes and co-polymers thereof, derivativized celluloses such as alkyl cellulose, hydroxyalkyl celluloses, cellulose ethers, cellulose esters, nitro celluloses, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, and cellulose sulfate sodium salt (jointly referred to herein as "synthetic celluloses"), polymers of acrylic acid, methacrylic acid or copolymers or derivatives thereof including esters, poly(methyl methacrylate), poly(ethyl methacrylate), poly(butylmethacrylate), poly(isobutyl methacrylate), poly(hexylmethacrylate), poly(isodecyl methacrylate), poly(lauryl methacrylate), poly(phenyl methacrylate), poly(methyl acrylate), poly(isopropyl acrylate), poly(isobutyl acrylate), and poly(octadecyl acrylate) (jointly referred to herein as "polyacrylic acids"), poly(butyric acid), poly(valeric acid), and poly(lactide-co-caprolactone), copolymers and blends thereof. As used herein, "derivatives" include polymers having substitutions, additions of chemical groups, for example, alkyl, alkylene, hydroxylations, oxidations, and other modifications routinely made by those skilled in the art. Examples of preferred non-biodegradable polymers include ethylene vinyl acetate, poly(meth)acrylic acid, polyamides, copolymers and mixtures thereof Examples of preferred biodegradable polymers include polymers of hydroxy acids such as lactic acid and glycolic acid, polylactide, polyglycolide, polylactide co glycolide, and copolymers with PEG, polyanhydrides, poly(ortho) esters, polyurethanes, poly(butyric acid), poly(valeric acid), and poly(lactide-co-caprolactone). Representative natural polymers include proteins and polysaccharides.

The choice of solvent depends on the bulk material and the form of the material fed to the atomizer, e.g., whether the material is to be dissolved, suspended, or emulsified in the solvent. In a preferred embodiment for use with a polymeric material, the solvent is an organic solvent that is volatile or has a relatively low boiling point or can be removed under vacuum and which is acceptable for administration to humans in trace amounts. Representative solvents include acetic acid, acetaldehyde dimethyl acetal, acetone, acetonitrile, butynol, chloroform, chlorofluorocarbons, dichloromethane, dipropyl ether, diisopropyl ether, N,N-dimethlyformamide (DMF), demethyl sulfoxide (DMSO), dioxane, ethanol, ethyl acetate, ethyl formate, ethyl vinyl ether, glycerol, heptane, hexane, isopropanol, methanol, methylene chloride, nitromethane, octane, pentane, tetrahydrofuran (THF), toluene, 1,1,1-trichloroethane, 1,1,2-trichloroethylene, water, xylene, and combinations thereof. In general, the polymer is dissolved in the solvent to form a polymer solution having a concentration of between 0.1 and 75% weight to volume (w/v), more preferably between 0.5 and 30% (w/v).

The present invention will be further understood with reference to the following non-limiting examples.

EXAMPLE 1
Comparison of Secondary Drying Apparati

Three identical polymer emulsions were prepared, each composed of droplets of an aqueous phase suspended in a continuous polymer/organic solvent phase. The polymer was poly(lactide-co-glycolide) (PLGA) (50:50, MW approximately 35,000 Da) and the organic solvent was methylene chloride. The emulsions were sprayed through identical nozzles under identical process conditions of emulsion flow rate, atomization rate, drying gas rate, drying gas inlet temperature, and drying gas outlet temperature. Each emulsion was sprayed into a 6" (15.24 cm) diameter primary drying chamber ("PDC").

Three different secondary drying apparati ("SDA") were evaluated: a 4" (10.16 cm) diameter drying chamber, a 6" (15.24 cm) diameter drying chamber, and a 1.5" (3.81 cm) diameter coil 100' (30.5 m) in length. The total drying chamber volume and estimated residence times for each design combination is provided in Table 1.

TABLE 1

Drying Chamber Dimensions and Particle Residence Time Factor

| Length of PDC (in.) [cm] | Volume of PDC (in³) [cm³] | Diameter of SDA (in.) [cm] | Length of SDA (in.) [cm] | Volume of SDA (in³) [cm³] | Total Volume (in³) [cm³] | Residence Time Factor |
|---|---|---|---|---|---|---|
| 14.0 [35.6] | 396 [6487] | 4.0 [10.16] | 40.0 [101.6] | 503 [8237] | 898 [14724] | 1x |
| 14.0 [35.6] | 396 [6487] | 6.00 [15.24] | 40.0 [101.6] | 1131 [18533] | 1527 [25020] | 1.7x |
| 14.0 [35.6] | 396 [6487] | 1.50 [3.81] | 1200.0 [3048] | 2121 [34750] | 2516 [41237] | 2.8x |

The reduction ratio of the cross-sectional flow area is shown in Table 2.

TABLE 2

Reduction Ratios of the Secondary Drying Apparati

| Diameter of PDC (in.) [cm] | x-Area of PDC (in²) [cm²] | Diameter of SDA (in.) [cm] | x-Area of SDA (in²) [cm²] | Reduction Ratio |
|---|---|---|---|---|
| 6.00 [15.24] | 28.27 [182.4] | 4.00 [10.16] | 12.57 [81.1] | 2.25:1 |
| 6.00 [15.24] | 28.27 [182.4] | 6.00 [15.24] | 28.27 [182.4] | 1:1 |
| 6.00 [15.24] | 28.27 [182.4] | 1.50 [3.81] | 1.77 [11.4] | 16:1 |

Yield was determined by dividing the collected product mass by the starting solid mass. Particle size of the spray dried product was measured using a Coulter MultiSizer. Moisture content of the spray dried product was determined by Karl Fischer titration. The results of the experiment are shown in Table 3.

TABLE 3

Performance Results of Drying Study

| Drying Chamber Design | Batch Size (L) | Yield (% initial solids) | Size-Number Mean (μm) | Moisture Content (%) |
|---|---|---|---|---|
| 6" + 4" | 1.5 | 65.9 | 2.002 | 17.63 |
| 6" + 6" | 1.5 | 54.2 | 1.856 | 11.72 |
| 6" + 1.5" | 1.5 | 72.0 | 2.040 | 6.86 |

The coil system produced the highest yield (72%) and the lowest moisture (6.86%) of the three systems evaluated. As shown in Table 1, the residence times and drying capacities of the three systems are not identical, which probably accounts for at least some of the variation in measured moisture content. The variation in yield, however, is more striking, since if one were to increase the lengths of the 4" (10.16 cm) and 6" (15.24 cm) secondary chambers to provide a volume identical to that of the coils, the yield for the 4" (10.16 cm) and 6" (15.24 cm) secondary chamber systems would be even less than that of the coil system. The yield difference is most likely due to the comparatively lower drying gas velocity in the 4" (10.16 cm) and 6" (15.24 cm) secondary chambers.

EXAMPLE 2
Comparison of Secondary Drying Apparati

Four identical polymer emulsions were prepared, each composed of an aqueous phase suspended in a continuous phase of polymer dissolved in an organic solvent. The emulsions were spray dried through identical nozzles under identical process conditions of emulsion flow rate, atomization rate, drying gas rate, drying gas inlet temperature, and drying gas outlet temperature. Each emulsion was sprayed into the same primary drying chamber, which had a diameter of 6" (15.24 cm) and a length of 18" (45.72 cm), for a total volume of 509 $in^3$ (8340 $cm^3$).

One emulsion was sprayed only into the primary drying chamber, while the three other emulsions were sprayed into the primary drying chamber and a secondary drying apparatus. Three different secondary drying apparati having the same volume were evaluated: a 6" (15.24 cm) diameter tube, a 4" (10.16 cm) diameter tube, and a 1.5" (3.81 cm) diameter tube. Additional adaptors and tubing (1.5" (3.81 cm) diameter) were used to connect the primary drying chamber to the secondary drying apparatus and to connect the secondary drying apparatus to the cyclone. Since the volume of the connecting pieces was approximately the same for all PDC/SDA configurations, the total drying chamber volume remained approximately the same. The dimensions and volumes are shown below in Table 4.

TABLE 4

Drying Chamber Dimensions and Volumes

| Vol. PDC ($in^3$) [cm] | Dia. SDA (in.) [cm] | Length SDA (in.) [cm] | Vol. SDA ($in^3$) [$cm^3$] | Connecting Vol. ($in^3$) [$cm^3$] | Total Vol. ($in^3$) [$cm^3$] | Ratio of Cross-Sectional Area (PDC:SDA) | Ratio of Length (PDC: DSA) |
|---|---|---|---|---|---|---|---|
| 509 [8340] | N/A | N/A | 0 [0] | 10 [164] | 519 [8504] | N/A | N/A |
| 509 [8340] | 6.00 [15.24] | 37.0 [94.0] | 1046 [17143] | 320 [5244] | 1875 [30727] | 1:1 | 1:2.1 |
| 509 [8340] | 4 [10.16] | 85.0 [215.9] | 1068 [17504] | 260 [4261] | 1837 [30104] | 2.25:1 | 1:4.7 |
| 509 [8340] | 1.50 [3.81] | 600.0 [1524.0] | 1060 [17375] | 280 [4588] | 1849 [30303] | 16:1 | 1:33.3 |

Samples of each product were lyophilized to determined the dry weight fraction of the product. The dry yield then was calculated as a percentage of the total polymer mass sprayed, using the following equation:

$$\text{Yield}=[(\text{collected product mass})\times(\text{dry weight fraction})]\div(\text{total polymer mass sprayed}) \quad \text{(EQ. 1)}$$

Particle size of the spray dried product was measured using a Coulter Multisizer. Moisture content of the spray dried product was determined by Karl Fischer titration. The results of these analyses are provided in Table 5.

TABLE 5

Performance Results of Drying Study

| Diameter of SDA (in.) [cm] | Ratio of Sectional Area (PDC:SDA) | Batch Size (L) | Size-Number Mean (μm) | Moisture Content (%) | Dry Yield (%) |
|---|---|---|---|---|---|
| No SDA | N/A | 6.0 | 2.201 | 28.6 | 92.7 |
| 6 [15.24] | 1:1 | 6.0 | 1.892 | 13.0 | 64.8 |
| 4 [10.16] | 2.25:1 | 6.0 | 1.967 | 13.3 | 72.7 |
| 1.5 [3.81] | 16:1 | 6.0 | 1.956 | 12.2 | 75.0 |

The moisture content of 28.6% obtained when the primary drying chamber was used without the secondary drying apparatus was undesirably high. The results show that the use of a secondary drying apparatus reduced the moisture content by approximately 55% and also reduced the mean particle size slightly. The size and moisture content obtained with the secondary drying apparatus were approximately the same for all configurations, which is expected since the emulsions were sprayed under identical process conditions and since each secondary drying apparatus had essentially the same total volume and residence time.

The results indicate that the use of a secondary drying apparatus reduced the dry yield, presumably since some product was deposited onto the walls of the secondary drying apparatus, but that the yield increased as the ratio of the cross-sectional area of the primary drying chamber to the secondary drying apparatus increased. The yield difference was most likely due to the comparatively lower drying gas velocity in the 6" and 4" diameter secondary drying apparatus. By using a long length of smaller diameter tubing, it is possible to maximize the drying capacity while minimizing product loss. The experiment indicates that the drying capacity of the spray dryer can be increased by using a secondary drying apparatus and that the decrease in product yield can be minimized by using the secondary drying apparatus described herein.

EXAMPLE 3

Making PLGA Microparticles at Low Temperatures

The spray drying apparatus described in Example 1 was used to make and dry particles of poly(lactide-co-glycolide) (PLGA) (50:50, MW approximately 35,000 Da) using low processing temperatures. The primary drying chamber had a length of 19 inches (48.26 cm) and a diameter of 6 inches (15.24 cm), and the secondary drying apparatus had a diameter of 1.5 inches (3.81 cm) and a length of 100 feet (30.5 m).

The PLGA was dissolved in methylene chloride to form approximately 29 L (liters) of a 3% (w/w) PLGA solution. The polymer solution then was emulsified with 2 L of an aqueous solution of 18% ammonium bicarbonate in a 75 liter mixing tank fitted with an Admix Rotosolver homogenizer (Model 100RS88SS) by homogenizing for 6.5 minutes at 3450 RPM.

The emulsion was sprayed at a flow rate of 150 ml/min. and aerosolized with nitrogen at a flow rate of 115 liter/min. in an internal-mixing air-atomizing nozzle. Drying gas (nitrogen) was heated to an inlet temperature of 55° C. and introduced into the drying chamber at a flow rate of 105 kg/hr. The drying gas outlet temperature was found to be 12° C. The partially dried particles (exiting the primary drying chamber) were passed through the secondary drying apparatus, which was jacketed with water at 18° C., and then collected.

The overall yield of particles collected was 91%. The particles had a size distribution characterized by a number-average ($X_n$) diameter of 2.0 Am and a volume-average diameter ($X_v$) of 5.3 μm, as determined in a Coulter counter. The moisture content was 5.18% (w/w). The low moisture content was achieved using drying gas temperatures significantly lower than standard practice in current spray drying systems.

EXAMPLE 4

Making PEG Microparticles at Low Temperatures

The process described in Example 3 was repeated, except for the following parameters: (1) polyethylene glycol (PEG) (MW 8000) was used in place of PLGA; (2) the primary chamber length was 25 inches (63.5 cm); (3) the homogenization time was 10 minutes; (4) the drying gas flow rate was 150 kg/hr; and (5) the flow rate of polymer emulsion to the spray nozzle was 200 ml/min.

The overall yield of free-flowing particles collected was 96%. The low temperature processing allowed the preparation of particles of PEG, which might otherwise melt or fuse together during processing, as the melting temperature of PEG (MW 8000) is typically between about 55 and 65° C. Examples 3 and 4 thus demonstrate that both the inlet and outlet drying gas temperatures can be lowered using the spray drying devices and methods described herein as compared to those temperatures typically used in conventional spray drying.

Modifications and variations of the present invention will be obvious to those of skill in the art from the foregoing detailed description. Such modifications and variations are intended to come within the scope of the following claims.

We claim:

1. A method of making particles comprising
   (a) spraying an emulsion, solution or suspension which comprises a solvent and a bulk material through an atomizer, in a primary drying chamber having a discharge outlet and containing a drying gas, to form droplets of the solvent and bulk material dispersed in the drying gas;
   (b) evaporating a portion of the solvent into the drying gas to solidify the droplets and form particles;
   (c) flowing the particle and drying gas through a secondary drying apparatus comprising tubing having an inlet in fluid communication with the discharge outlet of the primary drying chamber, to evaporate a second portion of the solvent into the drying gas,
   wherein the ratio of the cross-sectional area of the primary drying chamber to the cross-sectional area of the tubing is at least 4:3, and
   wherein the ratio of the length of the tubing to the length of the primary drying chamber is at least 2:1.

2. The method of claim 1 wherein the ratio of the length of the tubing to the length of the primary drying chamber is at least 3:1.

3. The method of claim 1 wherein the ratio of the cross-sectional area of the primary drying chamber to the cross-sectional area of the tubing is between about 2:1 and 500:1.

4. The method of claim 3 wherein the ratio of the cross-sectional area of the primary drying chamber to the cross-sectional area of the tubing is between about 4:1 and 100:1.

5. The method of claim 4 wherein the ratio of the cross-sectional area of the primary drying chamber to the cross-sectional area of the tubing is about 16:1.

6. The method of claim 1 wherein the tubing is in a coil.

7. The method of claim 1 wherein the tubing is jacketed.

8. The method of claim 7 wherein the jacketing contains cooling water.

9. The method of claim 1 wherein the bulk material is a polymer and the particles are microparticles.

10. The method of claim 9 wherein the microparticles are between about 1 and 10 μm in diameter.

11. The method of claim 9 wherein the microparticles contain a therapeutic or diagnostic agent.

12. The method of claim 1 wherein the bulk material is a therapeutic or diagnostic agent.

13. The method of claim 1 wherein the solution or suspension further comprises a volatile salt that is volatilized in step (b), step (c), or a combination thereof.

14. The method of claim 1 wherein the drying gas entering the primary drying chamber in step (a) has an inlet temperature less than 100° C.

15. The method of claim 14 wherein the inlet temperature is less than 60° C.

16. The method of claim 15 wherein the inlet temperature is less than 40° C.

17. The method of claim 1 wherein the drying gas exiting the secondary drying apparatus has an outlet temperature less than 100° C.

18. The method of claim 7 wherein the outlet temperature is less than 60° C.

19. The method of claim 8 wherein the outlet temperature is less than 40° C.

20. The method of claim 9 wherein the outlet temperature is less than 25° C.

* * * * *